United States Patent
Giordani et al.

(10) Patent No.: US 8,656,466 B2
(45) Date of Patent: Feb. 18, 2014

(54) DATA PROCESSING WITH A POSTERIORI OR A PRIORI AUTHENTICATION

(75) Inventors: Michel Giordani, Grenoble (FR);
Yoann Rigolle, Meylan (FR);
Guillaume Garnier De Falletans, Seyssins (FR)

(73) Assignee: France Telecom, Paris (FR)

( * ) Notice: Subject to any disclaimer, the term of this patent is extended or adjusted under 35 U.S.C. 154(b) by 108 days.

(21) Appl. No.: 12/826,090

(22) Filed: Jun. 29, 2010

(65) Prior Publication Data

US 2011/0004925 A1 Jan. 6, 2011

(30) Foreign Application Priority Data

Jun. 29, 2009 (FR) ...................................... 09 54433

(51) Int. Cl.
*H04L 29/06* (2006.01)
(52) U.S. Cl.
USPC .................................................. 726/6; 726/10
(58) Field of Classification Search
USPC .................... 726/5, 6, 7, 10, 18, 19
See application file for complete search history.

(56) References Cited

U.S. PATENT DOCUMENTS

| | | | | |
|---|---|---|---|---|
| 6,697,947 | B1* | 2/2004 | Matyas et al. | 713/182 |
| 2001/0039504 | A1 | 11/2001 | Linberg et al. | |
| 2002/0178271 | A1 | 11/2002 | Graham et al. | |
| 2008/0086767 | A1* | 4/2008 | Kulkarni et al. | 726/9 |

OTHER PUBLICATIONS

French Search Report and Written Opinion dated Feb. 24, 2010 for corresponding French Application No. 09 54433, filed Jun. 29, 2009.

* cited by examiner

*Primary Examiner* — Edward Zee
(74) *Attorney, Agent, or Firm* — David D. Brush; Westman, Champlin & Koehler, P.A.

(57) ABSTRACT

A method and apparatus are provided for processing data. The method includes a step of receiving, during a first communication session established with said server, a request formulated by a first user defining at least one processing operation to be executed on first data, and a step of executing said processing operation on said first data, during a second communication session established with said server after said first session for a second user. The step of executing is applied on condition that the second user has been authenticated via a strong authentication method during the second session and that a relationship between the first and second users has been verified.

17 Claims, 2 Drawing Sheets

DATA PROCESSING WITH A POSTERIORI OR A PRIORI AUTHENTICATION

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure relates to the field of computer data processing and more precisely a data processing method and associated device, which may be implemented as a server.

BACKGROUND OF THE DISCLOSURE

The processing of sensitive computer data poses various problems. In particular, in the medical world in France, the law requires strong protection of medical computer data and recommends for this that health professionals use a smart card as a strong authentication means for accessing these medical data.

The authentication of the entity requiring access to computer data is a preferred means for ensuring the protection of sensitive computer data. Simple authentication (typically with an identifier and simple password) is commonly used but does not provide a sufficient level of security to ensure the protection of sensitive computer data. Its main weakness lies in the ease with which the identity of the entity can be usurped: by virtue, for example, of hacking techniques based on social engineering which make it possible to find a password defined by a user.

It is therefore necessary to use strong authentication for effective protection of sensitive computer data. Strong authentication is defined here as two factor authentication or multiple factor authentication. The use of the smart card, in association with a second item of authentication data of the PIN code type, is for example a strong authentication solution making it possible, for example, to obtain a security level that is sufficient to control access to sensitive computer data.

Such strong authentication applies various constraints on the user: he must carry his authentication means (for example a card, a token, etc), have a reader that is appropriate for this authentication means, and a terminal compatible with the authentication method required to access the service. It is therefore not systematically possible for this user to authenticate himself in an appropriate manner with a server controlling access to data, particularly when this user has an itinerant occupation and he frequently travels without being able to carry all the necessary equipment with him.

The inventors of the present disclosure have therefore noted the need to have a technique for protecting access to sensitive computer data which offers a security level equivalent to that provided by strong authentication, but without being as constraining as a strong authentication.

SUMMARY

An illustrative aspect of the present disclosure concerns a first data processing method applied by a server, comprising a step of receiving, during a first communication session established with said server, a request formulated by a first user defining at least one processing operation to be executed on first data;

a step of executing said processing operation on said first data, during a second communication session established with said server after said first session for a second user, said execution step being designed to be applied on condition, on the one hand, that the second user has been authenticated via a strong authentication method during the second session and, on the other hand, that a relationship between the first and second users has been verified.

This first embodiment corresponds to a strong a posteriori authentication method.

According to this first data processing method, a first user can obtain a first access to a service for processing sensitive data. The operations required during access without strong authentication, and therefore the data resulting from these operations, are not confirmed, that is to say effectively executed, until a second time on request from a second user (usually the same first user or his delegate) during a subsequent access with strong authentication.

It is by decoupling a first phase in which the operations to be executed are defined, or even simulated, from a second phase in which these operations are confirmed, that is to say effectively executed, that an exemplary embodiment achieves this result.

For reasons of security, a relationship between the first user connected during the first access and the second user connected during the second access is also verified before the operations requested by the first user are confirmed, in order to ensure that only a second authorized user (usually the same first user or his delegate) can confirm such operations.

Security is guaranteed in that confidence in the defined processing operations is given a posteriori, during the confirmation of these operations following a strong authentication.

The disclosure concerns also a second data processing method applied by a server, comprising a step of receiving, during a first communication session established with said server, a request formulated by a first user in order to authorize at least one processing operation to be executed on first data;

a step of executing said processing operation on said first data, during a second communication session established with said server after said first session for a second user, said execution step being designed to be applied on condition, on the one hand, that the first user has been authenticated by a strong authentication method during the first session, and, on the other hand, that at least one relationship between the first and second users has been verified.

This second embodiment corresponds to a strong a priori authentication method.

According to this second data processing method, a first user can obtain access to a service for processing sensitive data with strong authentication during which this first user requests an authorization to execute operations, during a subsequent access without strong authentication.

In this case, confidence is given a priori for actions to be defined and confirmed during a subsequent session established with a lower level of confidence.

Here again, for reasons of security, a relationship between a first user connected during the first access and the second user connected during the second access is also verified before the operations requested by the second user are confirmed, in order to ensure that only the operations requested by a second authorized user can be confirmed.

According to an embodiment of the second method, the execution step is designed to be applied if a condition formulated by the first user during the first session is verified at the time of said execution.

This condition is designed to limit the risks of attack on the data because of this condition imposed by this first user: for example, by limitation of the nature of the requested operations or limitation to a predefined period of time.

The first and second methods lend themselves to various embodiments.

According to a first embodiment of the first or second method, said relationship is verified if a relationship is verified between a first item of information specific to the first user and a second item of information specific to the second user. This verifies that the two users have a link between them through information which they each hold.

According to yet another embodiment of the first or second method, said first, respectively second, item of information is supplied to said server by the first, respectively second, user, during said first, respectively second, session. This makes it possible to strengthen the security and risks of intervention of a pirate user: the first item of information is for example a secret which is held by the first user, shared with the second user, and which must be supplied by the second user.

According to another embodiment of the first or second method, said relationship is verified if the second user has delegated entitlements to the first user. This allows several users to cooperate in order to carry out an operation on data.

According to yet another embodiment of the first or second method, said relationship is verified if an identifier of the first user is identical to an identifier of the second user. In certain cases, a strict identity between the two users is imposed.

The various embodiments mentioned above can be combined; in particular, it is possible to provide that several relationships between the two users must be verified: equality of the identifiers or delegation of entitlements, with or without a relationship between two specific items of information or another additional condition.

According to an exemplary implementation, the various steps of the method are applied by software or a computer program, this software comprising software instructions intended to be executed by a data processor of a data processing device and being designed to control the execution of the various steps of this method.

In consequence, a further subject of the disclosure is a program that can be executed by a computer or by a data processor, this program comprising instructions for controlling the execution of the steps of a method as mentioned above.

This program may use any programming language and be in the form of source code, object code or of an intermediate code between source code and object code, such as in a partially-compiled form, or in any other desirable form.

A further subject of the disclosure is an information medium that can be read by a computer or a data processor and that comprises instructions of a program as mentioned above.

The information medium may be any entity or device capable of storing the program. For example, the medium may comprise a storage means, such as a ROM, for example a CD ROM or a microelectronic circuit ROM, or else a magnetic recording means, for example a diskette (floppy disk) or a hard disk.

Moreover, the information medium may be a transmissible medium such as an electric or optical signal, which may be conveyed via an electric or optical cable, by radio or by other means. The program may in particular be downloaded onto a network such as the Internet.

Alternatively, the information medium may be an integrated circuit in which the program is incorporated, the circuit being suitable for executing, or for being used in the execution of, the method in question.

According to another implementation, the method is applied by means of software and/or hardware components. For this purpose, the term "module" may correspond in this document to both a software component and a hardware component or else to a programmable hardware component, with or without integrated processor.

A software component is one or more computer programs, one or more routines of a program or in a more general manner any element of a program or of software that is capable of applying a function or a set of functions as is described below for the module concerned. In the same manner, a hardware component is any element of a hardware assembly that is capable of applying a function or a set of functions as is described below for the module concerned.

According to a second aspect, the disclosure relates to a first data processing device, comprising
 means for receiving, during a first established communication session, a request formulated by a first user defining at least one processing operation to be executed on first data;
 means for executing said processing operation on said first data, during a second communication session established with said server after said first session for a second user;
 said execution means being designed to be enabled on condition, on the one hand, that the second user has been authenticated via a strong authentication method during the second session, and, on the other hand, that at least one relationship between the first and second users has been verified.

This first device applies a strong a posteriori authentication.

According to this second aspect, the disclosure relates to a second data processing device, comprising
 means for receiving, during a first communication session established with said server, a request formulated by a first user to authorize at least one processing operation to be executed on first data;
 means for executing said processing operation on said first data during a second communication session established with said server after said first session for a second user,
 said execution means being designed to be enabled on condition, on the one hand, that the first user has been authenticated by a strong authentication method during the first session, and, on the other hand, that at least one relationship between the first and second users has been verified.

This second device applies a strong a priori authentication.

The advantages expressed for the first and second methods can be transposed respectively to the first and second devices, for example.

BRIEF DESCRIPTION OF THE DRAWINGS

Other objects, features and advantages will become apparent through the following description, given only as a non-limiting example and made with reference to the appended drawings in which.

DETAILED DESCRIPTION OF ILLUSTRATIVE EMBODIMENTS

Figure 1:
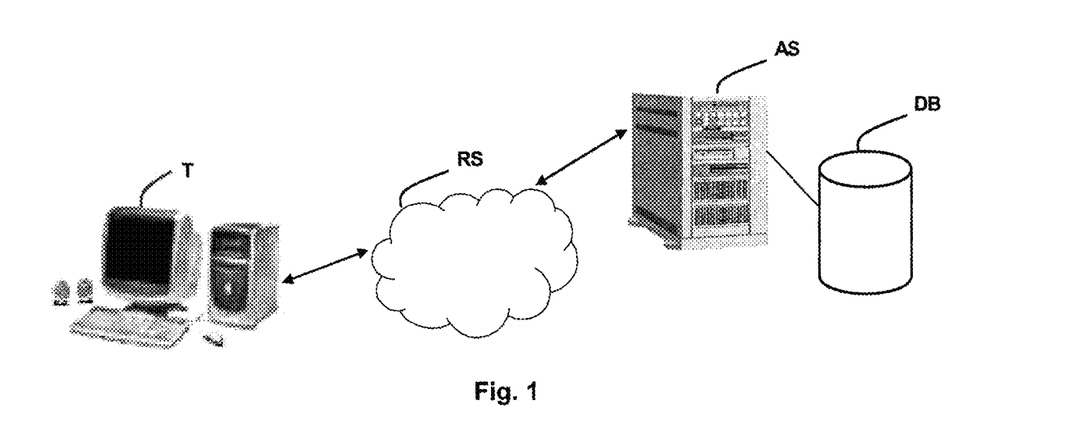
FIG. 1 represents schematically a communication system incorporating a device according to and example of the disclosure.

Exemplary aspects of the disclosure are described in greater detail with reference to FIG. 1 in the context of application to a service for processing medical data for health professionals. This service is applied by means of a server AS, typically in the form of a Web server, that can be accessed via a telecommunication network RS. Such a server can be accessed from a terminal T, connected to the network RS, a terminal from which a user can send requests to demand the execution of a data processing operation, send and/or receive data.

Various data processing operations are capable of being applied by means of this server at the request of a user:
  receipt and/or storage of data supplied by the user;
  editing and/or modification of stored data;
  transmission of data to a user or to an entity;
  deletion of stored data;
  etc.

The data are stored in a database DB associated with the application server AS. The stored data are, for example:
  medical data on the state of health of a patient;
  claim forms for reimbursement of medical expenses to be sent to social security;
  prescriptions made out for a patient;
  etc.

Figure 3A:
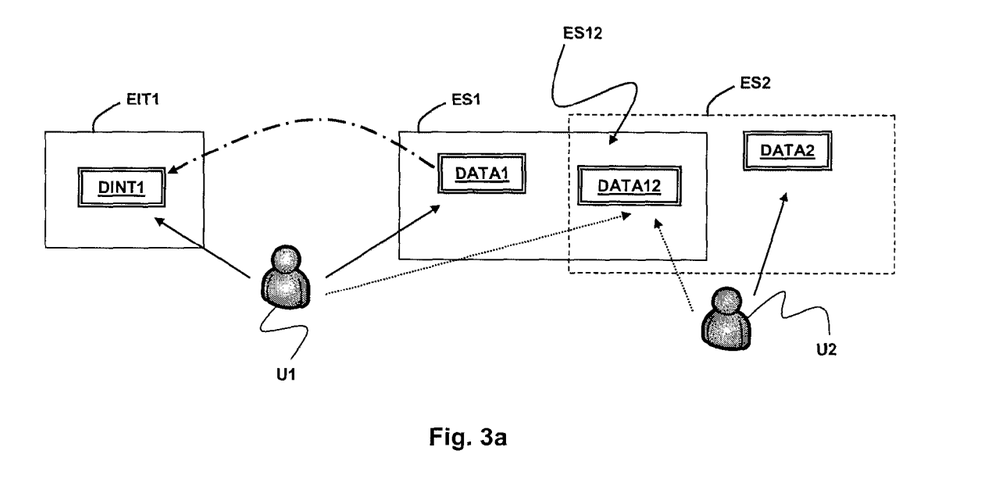
FIGS. 3a and 3b represent the content and the arrangement of memory spaces used for applying the method.
Figure 3B:
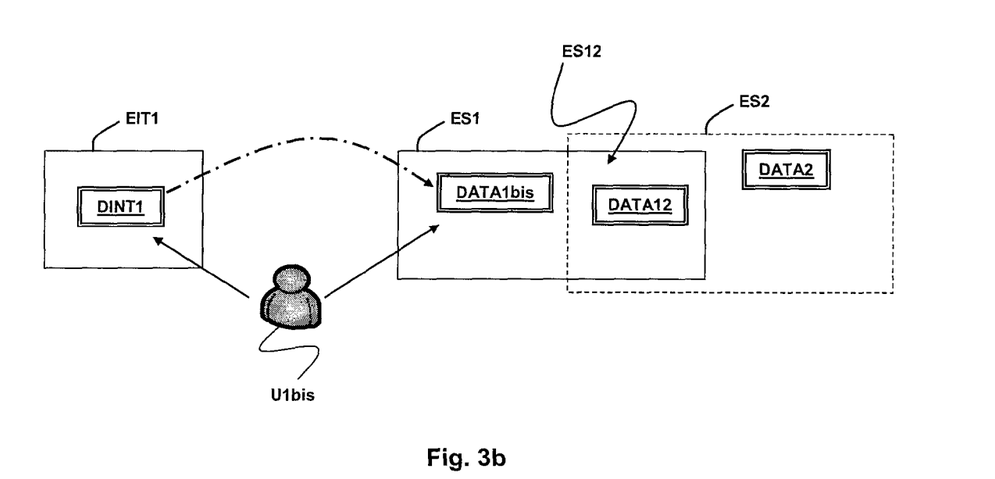

The server AS manages user access entitlements for the data stored in the database: each user is linked to a set of data for which he has access authorization, these data being, for example, stored in a data storage space which is specific to him. For example, as shown in FIG. 3a or 3b, a storage space ES1 is assigned to a user U1 and a storage space ES2 is assigned to a user U2, these two spaces having a common portion ES12 for the data with access shared between the users U1 and U2.

An authentication method is used to authenticate each user requesting to carry out an operation on such data.

Depending on the authentication method chosen to authenticate a user, the security level will vary. A weak authentication method (also called low-level authentification method) is based on a single factor (for example, the user supplies a password). A strong authentication method (also called high-level authentification method) is based on two or more factors; these factors being, fore example, chosen from the list below:
  what the user knows (for example, a password, a PIN code, a secret sentence, etc.);
  what the user holds (for example, a magnetic strip card, an RFID card, a USB key, a PDA, a smart card, etc.);
  what the user is (for a physical person, any biometric identification mark characteristic of the user: a fingerprint, a retina scan, a hand structure, a facial bone structure, etc.);
  what the user can do (for a physical person, handwritten signature, voice recognition, a type of calculation known only to the user, etc.).

In the example of application described here, it is supposed that the confidentiality level of the data processed by the server is such that a high level of authentication is required as a condition prior to the execution of an operation on data involving writing (creation, modification and deletion) of data in the database DB. In contrast, for a consultation of data or an operation involving only reading of data in the database DB, it is assumed that a simple authentication (i.e. single factor authentication, in particular an authentication based only on login/password) is sufficient to authorize this type of consultation or operation. It is in this way that confidence in the sensitive data is ensured at all times.

The server AS offers two modes of access to the data managed by this server:
  a first access mode, called the high-security mode, supposing that the connected user has been previously authenticated by a strong authentication method, the session in this case being called a high-security session;
  a second access mode, called a low-security mode, supposing that the connected user has been previously authenticated by a weak authentication method without strong authentication being required, the session being in this case called a low-security session.

During access in high-security mode a user U1 (U1 respectively U2) benefits from all the access entitlements: both in read and write mode on the data of the storage space ESi (ES1 respectively ES2) which is associated with him. During such access, all the operations requested by this user are authorized and executed by the server at the user's request.

During access in low-security mode, a user U1 has restricted access entitlements: only in read mode to the data in the storage space ESi which is associated with him, but not in write mode. During such access, only operations requiring no writing of data in this storage space ESi are authorized and executed. For the other operations, the user may request the execution thereof, or even view the result thereof, that is to say view the data resulting from the operation, but may not confirm the operations.

Specifically, the operations requested by a first user U1 during access in low-security mode are not immediately confirmed. They can be confirmed only during a second communication session established after the first communication session by a second user U1a, on condition:
  on the one hand, that this second session is established in high-security mode, that is to say that the second user U1a is authenticated by a strong authentication method;
  on the other hand, that a predetermined relationship between the first and second users U1 and U1a is verified.

This mechanism with two different access modes makes it possible to confirm a posteriori, during a high-security session, the operations requested by a first user U1 during a previous low-security session. This result is obtained by decoupling the phase for defining the operations to be executed from the phase of confirming these operations, strong authentication being required only for the final phase, that is to say the confirmation phase.

The security level of the system is similar to that of a system that would propose only the high-security access mode, since the executed operations are confirmed, that is to say made effective, only on condition of strong authentication by the second user. This ensures that only one duly authorized user can confirm processing operations and modify the data stored by the server. Security is guaranteed in that confidence in the defined processing operations is given a posteriori, when these operations are confirmed.

In order to carry out an a posteriori confirmation, the server is designed to store data, called intermediate data DINT1, based on which an operation requested by a first user U1 during the first session can be confirmed, that is to say effectively executed, during the second session. These intermediate data DINT1 comprise for example:

when the requested operation is a storage of data DATA1 supplied by the user: the supplied data DATA1 themselves and, optionally, a code identifying the requested operation;

when the requested operation is a transmission to a third-party user of data DATA1 supplied by the user: the supplied data DATA1 themselves and, optionally, a code identifying the requested operation;

when the requested operation modifies data DATA1 (operation of editing, modifying, converting data, etc.): either the data DATA1a resulting from this operation or the data DATA1 to be modified in association with a code identifying the requested operation;

when the requested operation deletes data DATA1 (deletion operation): the data DATA1 to be deleted in association with a code identifying the requested operation.

The intermediate data DINT1 thus defined are stored temporarily in a memory space specific to the user U1 having formulated the request to execute an operation and can be accessed only by this user U1. This memory space is in this instance called the intermediate memory space of the user U1 and is referenced EIT1 in FIG. 3a or 3b. The server AS uses this intermediate memory space EIT1 for the storage of intermediate data DINT1 relating to operations requested by the user U1. The server AS provides the user U1 associated with this intermediate memory space with a view of the content of this space.

So long as an operation on data DATA1 contained in the storage space ES1 produced by the user U1 has not been confirmed during a high-security session by a user U1a, the other users can read—supposing that they have access to the data DATA1—these data DATA1 only in the state in which they existed before the execution of the operation requested by this user U1. In particular, the content of the intermediate memory space EIT1 of the user U1 cannot be accessed by them.

During a session in low-security access mode, a user U1 can request or define any number of data processing operations intended to be executed by the server AS. The intermediate data DINT1 relating to all the operations defined by a user U1 are stored in the intermediate memory space EIT1 of the user U1. The server AS is designed to supply to the user U1, based on these intermediate data DINT1, a view of the content of this intermediate memory space EIT1: this view comprises for example a list of the operations requested by the user U1 and/or the data resulting from these operations and/or the data to be processed by these operations.

During a session with high-security access mode, a user U1a, on condition that he has a predefined relationship with a user U1, can confirm one or more of the operations from the list of operations requested by this user U1.

For this purpose, if this relationship is verified, this list of operations and/or a view of the data resulting from these operations is/are shown to a user U1a so that he can select the operation(s) that he wishes to confirm. As an alternative, all the operations requested by the user U1 are automatically confirmed when the user U1a shows a predefined relationship with the user U1.

When the server AS confirms operations requested by the user U1, it extracts the intermediate data DINT1 stored in the intermediate memory space EIT1 of the user U1 for these operations and then:

when these intermediate data DINT1 contain data DATA1a resulting from the operations to be confirmed, the server AS simply copies these data DATA1a from the intermediate memory space EIT1 specific to the user U1 into the space ES1 for storage of data associated with the user U1;

when these intermediate data DINT1 contain a list of operations with codes identifying these operations and the data DATA1 to which these operations apply, the server AS executes the requested operations in the order in which they have been requested based on these data DATA1 and the codes, and then saves the resulting data DATA1a in the space ES11 for storage of data of the user U1.

In both cases, the data DATA1a resulting from the confirmation can then be accessed, in read and write mode, by the user U1a who is currently connected, and by any other user authorized to access these data or the storage space in which they are stored.

When the initial data DATA1 have been modified, these data DATA1 are replaced by the resulting data DATA1a.

An aspect of the disclosure allows an a posteriori confirmation of sensitive operations and provides greater security than a method based only on simple authentication.

In order to guarantee the security of the system, a predetermined relationship between the first and second users U1 and U1a is verified before the confirmation of the operations requested by the user U1: in this manner, only a second user U1a having a link with a first user U1 can confirm operations requested by this first user, which makes it possible to ensure that a given user cannot confirm just any operation and thus maintains control over the data made available via this server.

This relationship is verified, for example, if the first user U1 and the second user U1a are identified by one and the same identifier ID1 by the server AS: in this case, these two users U1 and U1a are seen by the server AS as one and the same user. The identifier of a user is determined by the server AS on the basis of the identification and authentication data supplied by this user when he logs in. Such an identifier is usually distinct from the identification code (for example the "login") used as identification data at the time of the login. It is of little importance in this instance whether or not the users U1 and U1a are one and the same single physical person: all that matters is that these two users are known to the server AS as being one and the same "logical" user, that is to say are known under the same user identifier ID1. From this point of view, one or more aspects of the disclosure can be applied to the situation in which the identification data and weak authentication data of the user U1a (i.e. login and password) are transmitted to a user U1 who uses them to log in in unsecure access mode.

However, in order to protect the system against a usurpation of identification and authentication data (particularly those supplied by the user U1 during unsecured access), this relationship is also verified only if a secret of the first user U1, that is to say an item of information PWD1 specific to the first user U1, has been supplied to the server AS during the second session by the second user U1a. This item of information PWD1 is for example a key sentence, a password, a personal code or an object associated only with this user, etc. This item of information is supplied either by the user himself during the first session or generated and/or supplied by the server AS.

More generally, this relationship is verified if a relationship between an item of information PWD1 specific to the first user U1 and an item of information PWD1a specific to the second user U1a is established, this link being able to be:

a relationship of equality between the two items of information PWD1 and PWD1a;

a relationship of equality between one of these two items of information and a conversion (encryption, decryption, encoding, decoding, hashing, etc.) of the other item of information;

a relationship of equality between a conversion (encryption, decryption, encoding, decoding, hashing, etc.) of one of the items of information and a conversion of the other item of information (encryption, decryption, encoding, decoding, hashing, etc.).

Whatever the method used to verify whether a relationship exists between these two items of information PWD1 and PWD1a, these items of information can be obtained in different ways: they are either supplied by the user (and this is the case, for example, when such an item of information is an identifier of a user or when it is the user who generates his own code) or generated by the server AS (this is the case, for example, when such an item of information is in the form of a single-use password).

Any other method making it possible to establish that there is a relationship between the first and the second user can be used. Preferably, a one-to-one relationship will be defined and verified by the server AS in order to ensure that only one user is authorized to confirm operations requested by another user.

The verification of such a relationship makes it possible to prevent an operation of fraudulent origin, requested by a hacker, or confirmed a posteriori.

Finally, such a relationship can be used for the server AS as an identifier based on which the server AS can find a set of operations to confirm: in this case, the item of information PWD1 specific to the first user U1 and/or the item of information PWD1a specific to the second user U1a is stored in association with the intermediate data intended to be used to confirm operations defined by the first user. Then, when the second user logs in, the operations to be confirmed are determined based on the item of information PWD1a specific to the second user, provided that the relationship between the items of information PWD1 and PWD1a is verified.

1. The Case of Data Shared by Two Distinct Users U1 and U2

If the data to be modified are data D12 shared between the two logically distinct users U1 and U2 (that is to say identified by the server AS by means of two different identifiers ID1 and ID2), the user U1a=U2 can be authorized by the user U1 to confirm operations requested by the user U1 on shared data D12 or vice versa.

In this hypothesis, the intermediate memory space used for the operations on these shared data is then a space EIT12 common to these two users (not shown).

In this hypothesis also, the relationship to be verified between the users U1 and U2 must be a relationship other than a simple relationship of equality between user identifiers (see the examples above), since U1 and U2 are seen as being distinct by the server AS. The relationship to be verified will, for example, be that the users U1 and U2 share one and the same secret.

2. The Case of Delegation of Entitlements of a User U1a to a User U1

One or more aspects of the disclosure can be combined with any access-entitlement delegation mechanism. Specifically, an aspect of the disclosure applies also to the case in which a user U1a delegates entitlements to a user U1 so that the user U1 defines operations on data DATA1 of the data stored in the storage space ES1. The user U1a can then, during the high-security session, confirm the operations defined by the user U1. In this case, the relationship to be verified between the users U1 and U1a must be a relationship other than a simple relationship of equality between user identifiers (see the examples above), since U1 and U1a are seen to be distinct by the server AS. It will also be necessary for the server AS to first verify that the user U1a has a delegation at least for certain operations and/or certain data.

Figure 2:
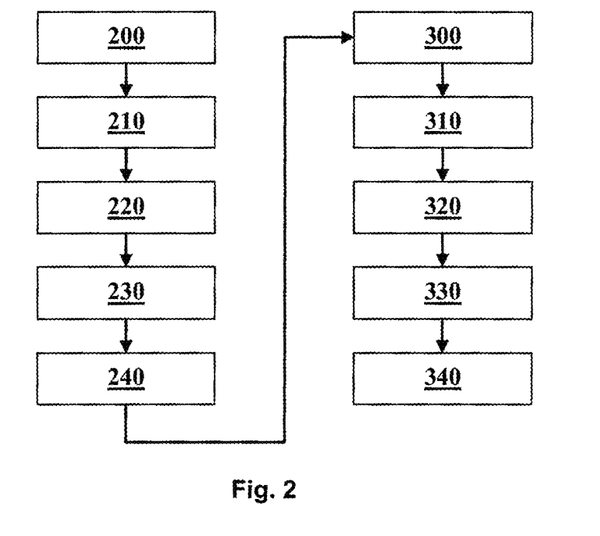
FIG. 2 represents a flowchart of a first embodiment of the method.

One embodiment of the method is described with reference to FIG. 2.

In step 200, a user U1 logs in to the server AS, supplying an identification code and a password so that he can be authenticated by the server AS by means of a simple authentication method. If the identification and authentication are successful, a first communication session in low-security mode is then established between his terminal T and the server AS. The server AS, according to the identifier ID1 of the logged-in user and the access authorizations associated with him, shows to this user a view of the storage space ES1 for which he has access authorization.

In step 210, if authentication is successful in step 200, the user U1 formulates a request for the execution of at least one processing operation on data DATA1 stored in the storage space ES1. The intermediate data DINT1, relating to the requested operations, are then stored by the server AS in the intermediate memory space EIT1 of the user U1 (FIG. 3a).

In step 220, the user U1 also transmits to the server AS a key sentence, for example "my name is Arthur". The server AS stores this key sentence in the intermediate memory space EIT1 of the user U1 with the intermediate data DINT1.

In step 230, the server AS presents to the user U1 a view of the content of the intermediate memory space EIT1 containing the intermediate data DINT1 generated by the server AS for the operation(s) requested and defined by the user U1 in step 210. This view comprises the list of the requested operations and/or the data DATA1a resulting from these operations and/or the data DATA1 to be processed by these operations with the operations codes that may be associated therewith.

In step 240, the first communication session is interrupted at the request of the first user U1.

In step 300, a user U1a logs in to the server AS supplying his identifier, PIN code and certificate extracted from his smart card, so that he can be authenticated by the server AS using a strong authentication method. If identification and authentication are successful, a second communication session in secure mode is then established between the terminal T and the server AS.

In step 310, the server AS, after detecting that the users U1 and U1a are identical and correctly identified by one and the same identifier ID1, shows the user U1a a view of the content of the intermediate memory space EIT1 associated with this identifier ID1. This view comprises the list of the operations requested and defined by the user U1 in step 220 and/or the data DATA1a resulting from these operations and/or the data DATA1 to be processed by these operations.

In step 320, the user U1a also transmits the key sentence already transmitted in step 220 and the server AS verifies that the key sentence is in fact the one stored in the intermediate memory space EIT1.

In step 330, the user U1a requests the confirmation of the processing operations viewed in step 320 and stored in the intermediate memory space EIT1 in association with the key sentence. The server AS then executes these operations, for example by copying data DATA1a resulting from these operations from the intermediate memory space EIT1 to the storage space ES1 1 associated with the user U1 (FIG. 3b).

In step 340, the second communication session is interrupted at the request of the user U1a.

One or more aspects of the disclosure extends to the use of a non-secure access mode in which only an identification of the first user U1 is required, in association with a secure access mode in which a weak or strong authentication of the second user U1a is required.

The second user U1a, logging in during the second session and capable of being authorized to confirm operations requested by the first user U1, is either identical to the first user U1, or the delegate of U1, or else a user U2 sharing data with the user U1.

By extension, the security level demanded during the second session is always higher than the security level demanded during the first session, hence the expression "strong a posteriori authentication" used to qualify the security process. Security is guaranteed in that confidence in the defined processing operations is given a posteriori when these operations are confirmed.

3. Strong a Priori Authentication

An aspect of the disclosure also provides for the application of a "strong a priori authentication" for which the security level demanded during the first session is always higher than the security level demanded during the second session.

In this case, the security process demands that a request be formulated by a first user U1 to authorize a priori a user U1a to define and/or confirm and/or execute operations on first data during a subsequent session in low-security mode (i.e. without strong authentication, but only under weak authentication), provided that a predefined relationship is verified between the first and second users U1 and U1a, this relationship being of the same nature as that described in the case of a strong a posteriori authentication. In this case, confidence is given a priori during the first session, the definition and/or the confirmation and/or the execution of the operations being able to be carried out with a lower level of confidence.

Preferably, the execution and/or the definition and/or the confirmation of a processing operation is authorized during the subsequent session only if a predetermined condition, fixed by the first user U1 during the first session at the time of formulating the authorization request, is satisfied. This condition is, for example, that the execution and/or the definition and/or the confirmation of an operation be required and/or started during a period defined by the first user U1 during the first session (for example, one day, one hour, etc.); or else that the operations defined/confirmed/executed during a subsequent session be limited to certain operations and/or to certain data chosen by the first user U1 during the first session. The object of this condition is to limit the risks of an attack on the data of the user U1.

Therefore, during subsequent access operations under weak authentication, the requested operations, and therefore the data resulting from these operations, will not be confirmed, that is to say that the operations will not effectively be executed unless the relationship between the two users U1 and U1a is verified and the condition formulated by the first user U1 is verified during the subsequent session at the time of execution and/or definition and/or confirmation of an operation.

The relationship to be verified between the two users U1 and U1a will preferably involve the second user U1a supplying an item of information specific to the first user U1, because, in the case of a strong a priori authentication, the consequences of a usurpation of identity by the second user U1a could be the destruction by the hacker of the data of the first user or their falsification. This is not the case in the strong a posteriori authentication method because the second user U1a has at least a possibility of verifying the requested operations before confirming them.

In the case of a strong a priori authentication, just as in the case of a strong a posteriori authentication, it is possible for the users U1 and U1a logging in successively to be able to be logically distinct from one another (for example U1a=U2), but for one to have a delegation from the other. In the case of a strong a priori authentication, it is the user U1, establishing the high-security session, who can delegate entitlements to another user U1a for a subsequent low-security session.

4. Example of Application: the Case of a Strong a Posteriori Authentication

An aspect of the disclosure can be applied, for example, to the medical field. In this field, in France, the law requires a high level of security of medical data and, for this purpose, recommends that health professionals use their CPS card (health professional card) as a strong authentication means for accessing these medical data. Increasingly the medical services therefore require that the transmitted data be so-called confidential data, that is to say data that is read- and write-protected. However, many of these same services accept that read (and even write) access is based on a simple authentication as a palliative solution to the CPS card, because the latter cannot be used in all cases.

Taking the case of a treating doctor who has his own surgery: during his working day, he can use the various secure services with his CPS card permanently inserted into the smart card reader of his work computer. When he returns home, he may not have his CPS card or he may not have a smart card reader on his personal computer. The only solution for accessing the secure service is then the simple authentication, an evident breach of security for a sensitive service.

In such a situation, an aspect of the disclosure allows the health professional to use the service for accessing data with a simple authentication and to define or simulate operations that will be confirmed only on his next login based on a strong authentication when, for example, this health professional has returned to his surgery. The confidentiality of the data thus transmitted will then be guaranteed.

Another instance of application in the health field relates to the practices of delegation to secretary's office of the entitlement to transmit electronic medical expenses claim forms. To do this, the doctor gives his personal identification code and password to the secretary's office. A person in the secretary's office can therefore request the execution of an operation by logging in and being authenticated with a simple authentication on the basis of the code and password supplied. The final confirmation, that is to say the effective transmittal of the medical expenses claim forms, is carried out at the request of the doctor at the time of another login with strong authentication of the doctor using his CPS card on the transmission to the doctor of a key sentence or secret used by the secretary.

There are many other fields of application for aspects of this disclosure, for example the banking, military, electronic administration, and education sectors, and others.

Although the present disclosure has been described with reference to one or more examples, workers skilled in the art will recognize that changes may be made in form and detail without departing from the scope of the disclosure and/or the appended claims.

What is claimed is:

1. A data processing method applied by a server, comprising:
    a step of receiving, during a first communication session established with said server, a request formulated by a first user defining at least one processing operation to be executed on first data; and
    a step of executing said processing operation on said first data, during a second communication session established with said server for a second user, in which the second user confirms the processing operation requested by the first user, the second communication session being established after interruption of said first communication session, wherein said step of executing is applied on condition that the second user has been authenticated via a strong authentication method during the second communication session and that a relationship between the first and second users has been verified.

2. The method according to claim 1, in which said relationship is verified if a relationship is verified between a first item of information specific to the first user and a second item of information specific to the second user.

3. The method according to claim 1, in which said relationship is verified if the second user has delegated entitlements to the first user.

4. The method according to claim 1, in which said relationship is verified if an identifier of the first user is identical to an identifier of the second user.

5. The method according to claim 2, in which said first item of information is supplied to said server by the first user, during said first communication session.

6. The method according to claim 2, in which said second item of information is supplied to said server by the second user during said second communication session.

7. A data processing method applied by a server, comprising:
   a step of receiving, during a first communication session established with said server, a request formulated by a first user in order to authorize at least one processing operation to be executed on first data; and
   a step of executing said processing operation on said first data, during a second communication session established with said server for a second user, in which the second user confirms the processing operation requested by the first user, the second communication session being established after interruption of said first communication session, said step of executing being applied on condition that the first user has been authenticated by a strong authentication method during the first communication session and that a relationship between the first and second users has been verified.

8. The method according to claim 7, in which the execution step is applied if a condition formulated by the first user during the first communication session is verified at the time of said execution.

9. The method according to claim 7, in which said relationship is verified if a relationship is verified between a first item of information specific to the first user and a second item of information specific to the second user.

10. The method according to claim 7, in which said relationship is verified if the second user has delegated entitlements to the first user.

11. The method according to claim 7, in which said relationship is verified if an identifier of the first user is identical to an identifier of the second user.

12. The method according to claim 9, in which said first item of information is supplied to said server by the first user, during said first communication session.

13. The method according to claim 9, in which said second item of information is supplied to said server by the second user during said second communication session.

14. A non-transitory recording medium that can be read by a data processor, on which a program is recorded comprising program code instructions for performing a method when executed by the data processor, the method comprising:
   a step of receiving, during a first communication session established with a server, a request formulated by a first user defining at least one processing operation to be executed on first data; and
   a step of executing said processing operation on said first data, during a second communication session established with said server for a second user, in which the second user confirms the processing operation requested by the first user, the second communication session being established after interruption of said first communication session, wherein said step of executing is applied on condition that the second user has been authenticated via a strong authentication method during the second communication session and that a relationship between the first and second users has been verified.

15. A non-transitory recording medium that can be read by a data processor, on which a program is recorded comprising program code instructions for performing a method when executed by the data processor, the method comprising:
   a step of receiving, during a first communication session established with a server, a request formulated by a first user in order to authorize at least one processing operation to be executed on first data; and
   a step of executing said processing operation on said first data, during a second communication session established with said server for a second user, in which the second user confirms the processing operation requested by the first user, the second communication session being established after interruption of said first communication session, said step of executing being applied on condition that the first user has been authenticated by a strong authentication method during the first communication session and that a relationship between the first and second users has been verified.

16. A data processing device, comprising
   means for receiving, during a first established communication session, a request formulated by a first user defining at least one processing operation to be executed on first data; and
   means for executing said processing operation on said first data, during a second communication session established with a server for a second user, in which the second user confirms the processing operation requested by the first user, the second communication session being established after interruption of said first communication session, said execution means being enabled on condition that the second user has been authenticated via a strong authentication method during the second communication session and that a relationship between the first and second users has been verified.

17. A data processing device, comprising
   means for receiving, during a first communication session established with a server, a request formulated by a first user to authorize at least one processing operation to be executed on first data; and
   means for executing said processing operation on said first data during a second communication session established with said server for a second user, in which the second user confirms the processing operation requested by the first user, the second communication session being established after interruption of said first communication session, said execution means being enabled on condition that the first user has been authenticated by a strong authentication method during the first communication session and that a relationship between the first and second users has been verified.

* * * * *